United States Patent
Jung et al.

(10) Patent No.: US 8,570,854 B2
(45) Date of Patent: Oct. 29, 2013

(54) APPARATUS AND METHOD FOR PROCESSING FAILURE OF COMPONENT CARRIER IN MULTIPLE CARRIER SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 13/375,464

(22) PCT Filed: May 31, 2010

(86) PCT No.: PCT/KR2010/003450
§ 371 (c)(1),
(2), (4) Date: Nov. 30, 2011

(87) PCT Pub. No.: WO2010/140798
PCT Pub. Date: Dec. 9, 2010

(65) Prior Publication Data
US 2012/0069728 A1    Mar. 22, 2012

Related U.S. Application Data

(60) Provisional application No. 61/220,565, filed on Jun. 25, 2009, provisional application No. 61/186,886, filed on Jun. 14, 2009, provisional application No. 61/184,299, filed on Jun. 4, 2009, provisional application No. 61/183,061, filed on Jun. 1, 2009.

(30) Foreign Application Priority Data

May 27, 2010    (KR) .......................... 10-2010-0049663

(51) Int. Cl.
*H04L 1/00*    (2006.01)
*H04L 12/26*    (2006.01)
*H04W 4/00*    (2009.01)

(52) U.S. Cl.
USPC .......................................... 370/216; 370/328

(58) Field of Classification Search
USPC .................................................. 370/216, 328
See application file for complete search history.

(56) References Cited

U.S. PATENT DOCUMENTS

2008/0020757 A1*    1/2008    Hans et al. ................. 455/432.2
2010/0151857 A1*    6/2010    Brisebois et al. ............. 455/434
2011/0021154 A1*    1/2011    Marinier et al. ........... 455/67.11

FOREIGN PATENT DOCUMENTS

| JP | 2009-017526 | 1/2009 |
| KR | 1020090028461 | 3/2009 |
| KR | 1020090029352 | 3/2009 |

* cited by examiner

*Primary Examiner* — Ronald Abelson
(74) *Attorney, Agent, or Firm* — Lee, Hong, Degerman, Kang & Waimey

(57) ABSTRACT

A method and apparatus of processing a failure of a component carrier (CC) in a multiple carrier system is provided. A user equipment detects a failed CC in which a failure occurs among a plurality of CCs and determines whether to declare a radio link failure based on the failed CC. If it is not the radio link failure, the user equipment reports information on the failed CC to a base station.

16 Claims, 8 Drawing Sheets

APPARATUS AND METHOD FOR PROCESSING FAILURE OF COMPONENT CARRIER IN MULTIPLE CARRIER SYSTEM

CROSS-REFERENCE TO RELATED APPLICATIONS

This application is the National Stage filing under 35 U.S.C. 371 of International Application No. PCT/KR2010/003450, filed on May 31, 2010, which claims the benefit of earlier filing date and right of prority to Korean Application Serial No. 10-2010-0049663, filed on May 27, 2010, and also claims the benefit of U.S. Provisional Application Ser. Nos. 61/220,565, filed on Jun. 25, 2009, 61/186,886, filed on Jun. 14, 2009, 61/184,299, filed on Jun. 4, 2009, and 61/183,061, filed on Jun. 1, 2009, the contents of which are all incorporated by reference herein in their entirety.

TECHNICAL FIELD

The present invention relates to wireless communications, and more particularly, to a method and apparatus for processing a failure of a component carrier in a multiple carrier system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20} MHz. On the other hand, the LTE-A employs multiple carriers using carrier aggregation. The carrier is defined with a center frequency and a bandwidth. A multiple-carrier system uses a plurality of component carriers having a narrower bandwidth than a full bandwidth.

A user equipment (UE) persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so bad that communication is currently impossible, the UE determines the current situation as a radio link failure.

A single carrier system uses only one carrier, and thus the radio link failure is declared when quality of one carrier is persistently bad.

A multiple carrier system uses a plurality of component carriers, and thus even if any one component carrier has bad quality, other component carriers may have good quality. This is because a channel state of component carriers having different frequency bands has a low correlation.

Accordingly, there is a need for a method capable of determining and processing a failure of a component carrier in a multiple carrier system.

DISCLOSURE OF INVENTION

Technical Problem

The present invention provides a method and apparatus for processing a failure of a component carrier in a multiple carrier system.

Solution to Problem

In an aspect, a method of processing a failure of a component carrier (CC) in a multiple carrier system is provided. The method includes detecting a failed CC in which a failure occurs among a plurality of CCs, determining whether to declare a radio link failure based on the failed CC, and if it is not the radio link failure, reporting information on the failed CC to a base station.

The failed CC detected among the plurality of CCs may be a CC of which transmission or reception repetitively fails in at least one of a medium access control (MAC) layer, a radio link control (RLC) layer, and a packet data convergence protocol (PDCP) layer.

The method may further include initiating a connection re-establishment procedure if the radio link failure is declared.

The method may further include detecting whether the failed CC is recovered, and reporting information on the recovered CC to the base station if the failed CC is recovered.

The method may further include receiving a CC management command indicating inactivation of the failed CC from the base station.

If the failed CC is a primary CC, the radio link failure may be declared.

Upon detecting a failure of a primary CC and at least one secondary CC, the radio link failure may be declared.

Upon detecting a failure of all of the plurality of CC, the radio link failure may be declared.

Upon detecting a failure of all active CCs among the plurality of CCs, the radio link failure may be declared.

In another aspect, a user equipment for processing a failure of a component carrier (CC) in a multiple carrier system is provided. The user equipment includes a radio frequency (RF) unit for transmitting and receiving a radio signal, and a processor operatively coupled to the RF unit and configured to implement a radio interface protocol. The processor is configured to detect a failed CC in which a failure occurs among a plurality of CCs, determine whether to declare a radio link failure based on the failed CC, and if it is not the radio link failure, report information on the failed CC to a base station.

Advantageous Effects of Invention

Even if a failure occurs in one of a plurality of component carriers, a user equipment does not have to directly declare a radio link failure. Therefore, a probability of declaring the radio link failure can decrease and quality of service can be improved.

A base station can know the occurrence of a failure or recovery of a component carrier of a user equipment. Therefore, a plurality of component carriers can be more effectively managed, and efficiency of radio resources can be improved.

MODE FOR THE INVENTION

Figure 1:
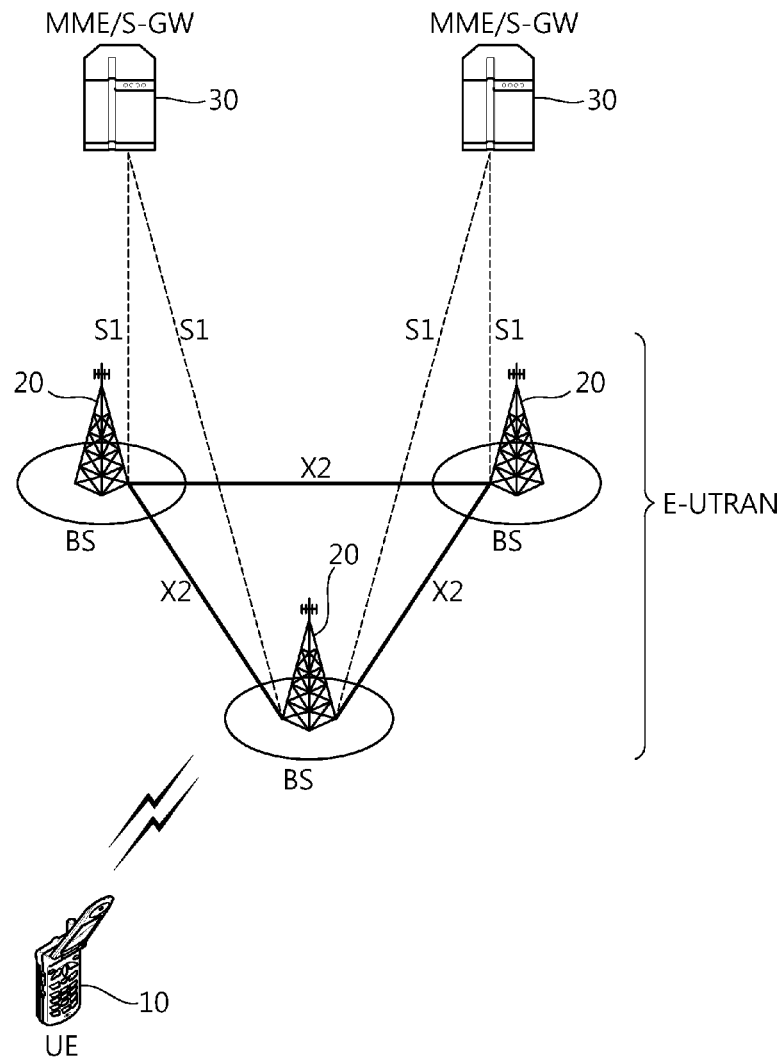
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
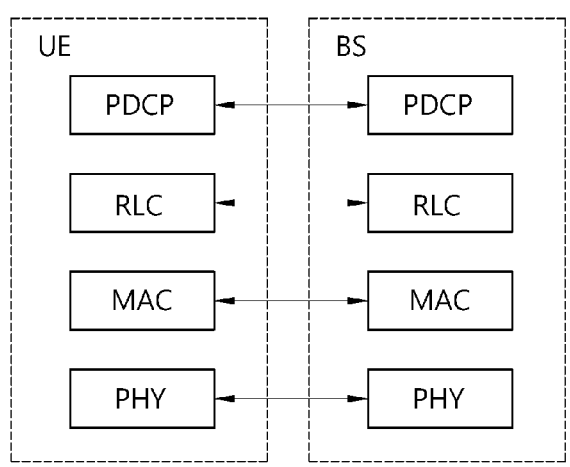
FIG. 2 is a diagram showing a radio protocol architecture for a user plane.
Figure 3:
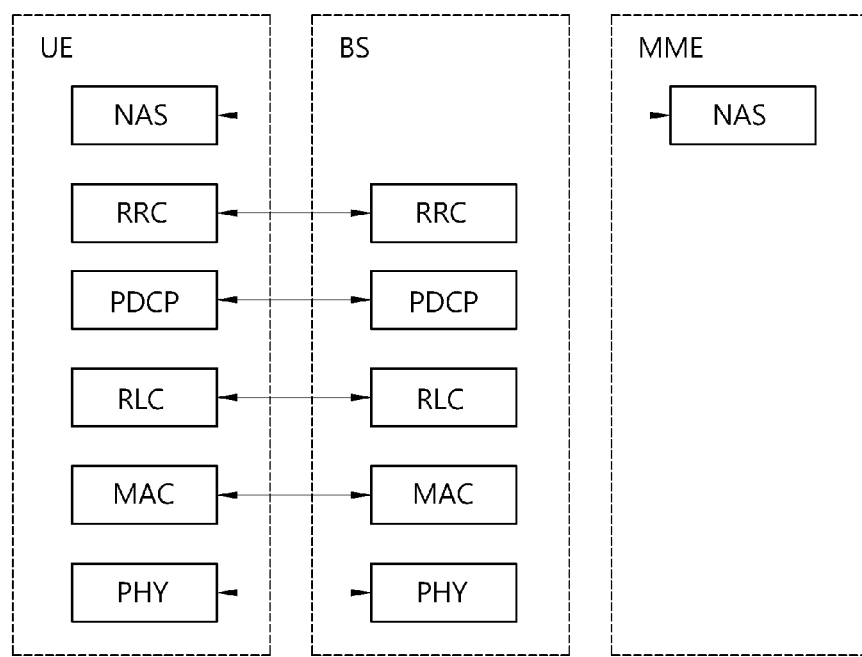
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC_CONNECTED mode, and otherwise the UE is in an RRC_IDLE mode.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several subcarriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC_CONNECTED state, and if the two layers are not connected to each other, it is called an RRC_IDLE state. When in the RRC_CONNECTED state, the UE has an RRC connection and thus the E-UTRAN can recognize a presence of the UE in a cell unit. Accordingly, the UE can be effectively controlled. On the other hand, when in the RRC_IDLE state, the UE cannot be recognized by the E-UTRAN, and is managed by a core network in a tracking area unit which is a unit of a wider area than a cell. That is, regarding the UE in the RRC_IDLE state, only a presence or absence of the UE is recognized in a wide area unit. To get a typical mobile communication service such as voice or data, a transition to the RRC_CONNECTED state is necessary.

When a user initially powers on the UE, the UE first searches for a proper cell and thereafter stays in the RRC_IDLE state in the cell. Only when there is a need to establish an RRC connection, the UE staying in the RRC_IDLE state establishes the RRC connection with the E-UTRAN through an RRC connection procedure and then transitions to the RRC_CONNECTED state. Examples of a case where the UE in the RRC_IDLE state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that must be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell resslection) procedure, and attempts RRC connection re-establishment to the new cell.

Figure 4:
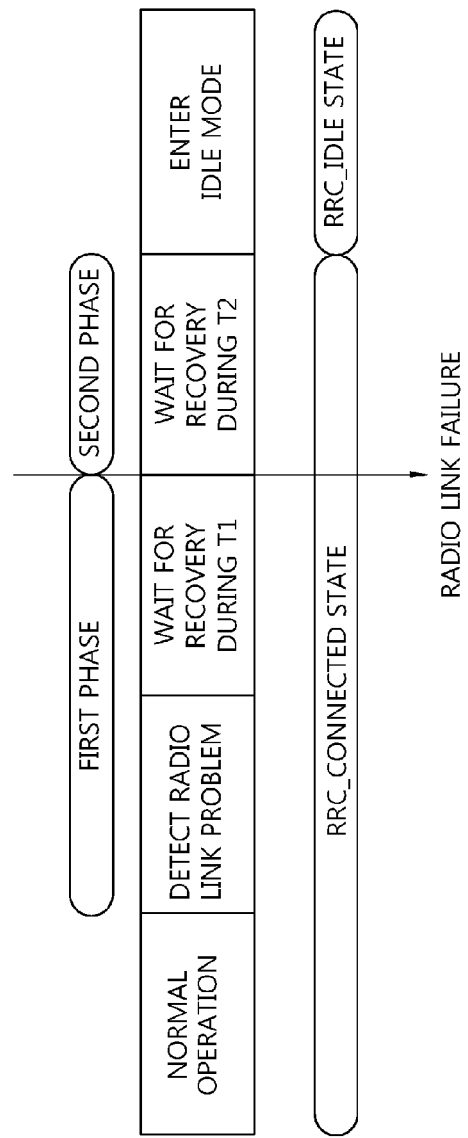
FIG. 4 shows an example of a radio link failure.

FIG. 4 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC_IDLE state. Alternatively, the UE may perform an RRC re-establishment procedure.

The RRC connection re-establishment procedure is a procedure for re-establishing an RRC connection in an RRC_CONNECTED state. Since the UE does not enter the RRC_IDLE state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 5:
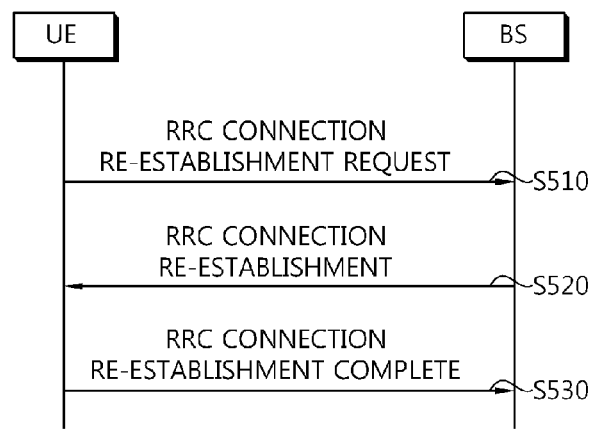
FIG. 5 is a flowchart showing a success of a connection re-establishment procedure.

FIG. 5 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S510).

If the selected cell is a cell having the context of the UE, i.e., a prepared cell, the BS accepts the RRC connection re-establishment request of the UE, and transmits an RRC connection re-establishment message to the UE (step S520). The UE transmits an RRC connection re-establishment complete message to the BS, and thus the RRC connection re-establishment procedure can be successful (step S530).

Figure 6:
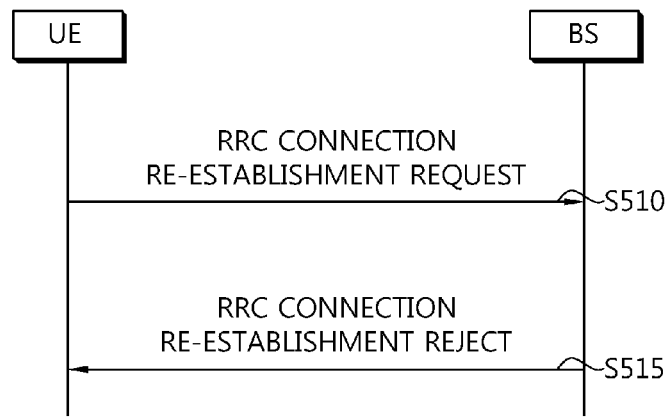
FIG. 6 is a flowchart showing a failure of a connection re-establishment procedure.

FIG. 6 is a flowchart showing a failure of a connection re-establishment procedure. A UE transmits an RRC connection re-establishment request message to a BS (step S510). If a selected cell is not a prepared cell, a BS transmits an RRC connection re-establishment reject message to a UE in response to an RRC connection re-establishment request (step S515).

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

A CC may correspond to a cell. A carrier frequency is a center frequency of the CC or a center frequency of the cell. When a UE supports a plurality of CCs, the UE can receive or transmits data through a plurality of CCs corresponding to multiple serving cells.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 7:
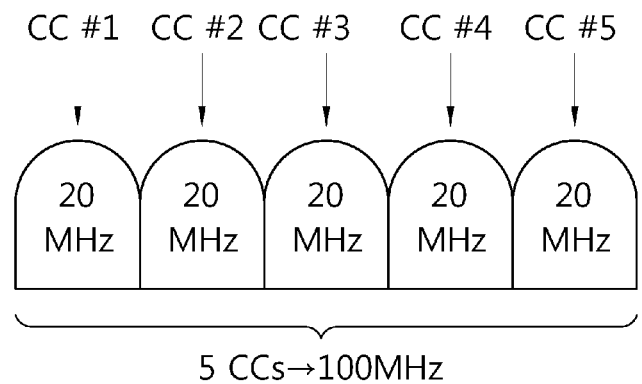
FIG. 7 shows an example of multiple carriers.

FIG. 7 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 8:
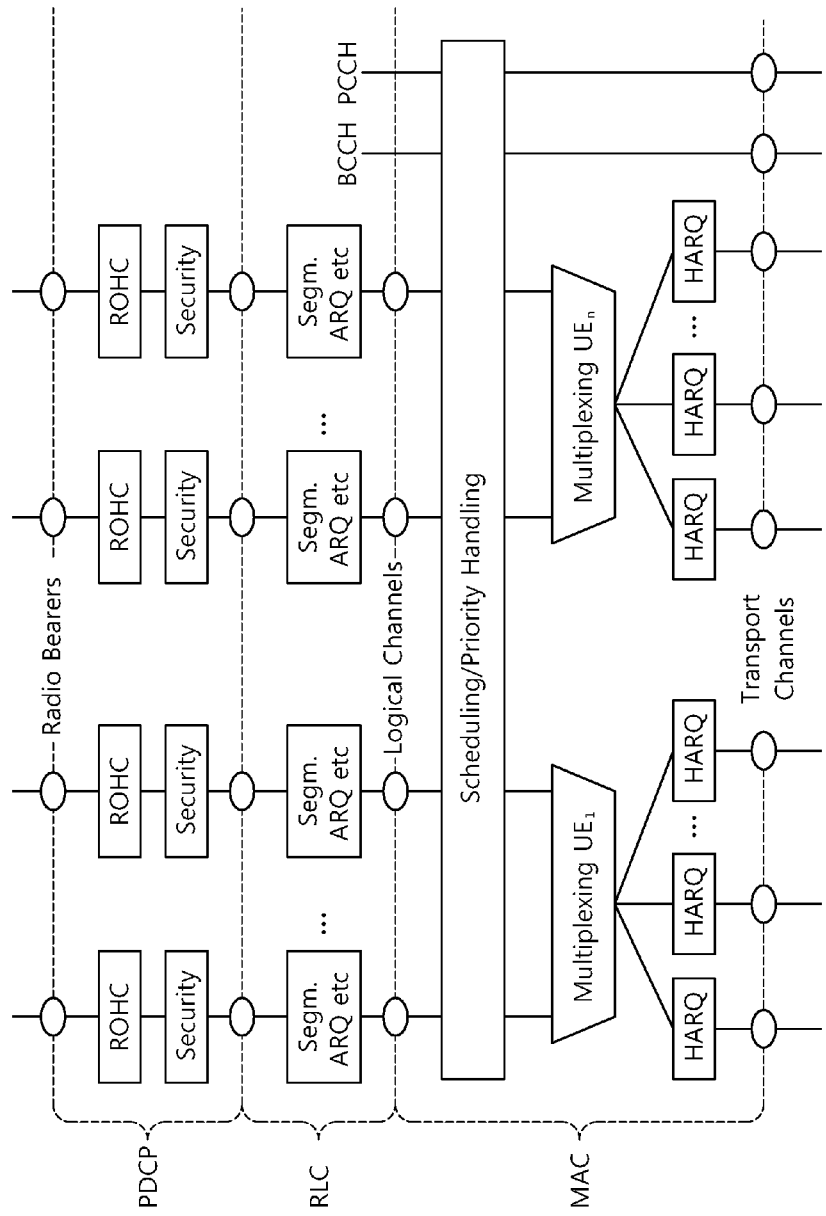
FIG. 8 shows a second-layer structure of a base station for multiple carriers.
Figure 9:
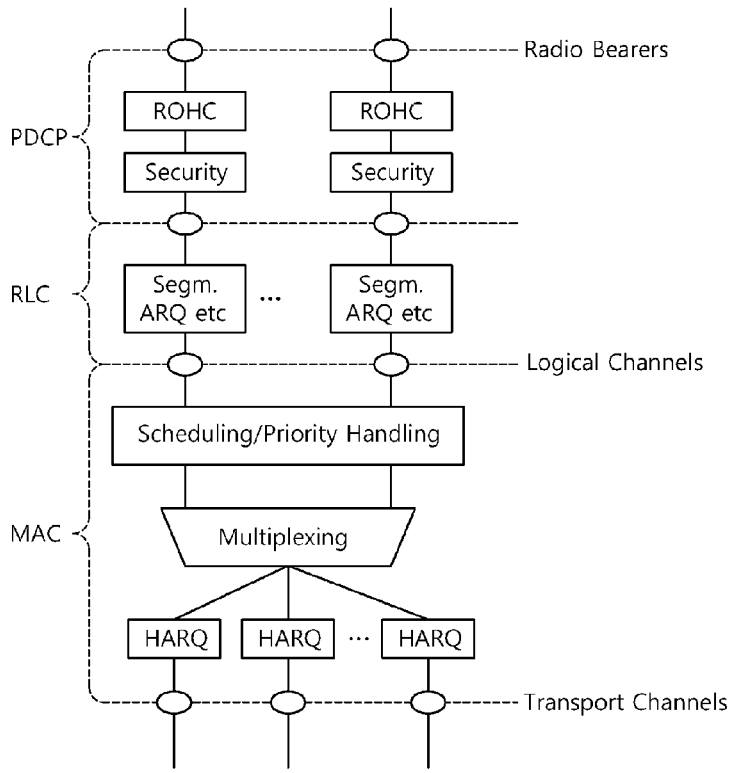
FIG. 9 shows a second-layer structure of a user equipment for multiple carriers.

FIG. 8 shows a second-layer structure of a BS for multiple carriers. FIG. 9 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block over a transport channel. Therefore, a plurality of HARQ entities can transmit or receive a plurality of transport blocks through a plurality of CCs.

A single carrier system uses only one carrier, and thus the radio link failure is declared when quality of one carrier is persistently bad.

On the other hand, a multiple carrier system uses a plurality of CCs, and thus even if one CC has poor quality, other CCs may have good quality. This is because a channel condition of CCs having different frequency bands has a low correlation. Therefore, even if quality of a CC become worse, it is not necessary to declare a radio link failure and initiate a RRC connection re-establishment procedure. In view of cell, even if quality of a serving cell become worse, it is not necessary to declare a radio link failure and initiate a RRC connection re-establishment procedure.

If the UE always declares the radio link failure as to any one CC among a plurality of CCs, a probability of declaring the radio link failure increases in proportion to the number of CCs. When the radio link failure is declared, the UE has to re-perform a cell re-selection procedure and an RRC connection re-establishment procedure. The RRC connection re-establishment procedure can be successful when a re-selected cell is a prepared cell. If the reselected cell is not the prepared cell, the UE has to transition to an RRC_IDLE state and resumes the connection. Further, even if the reselected cell is the prepared cell, a significantly large amount of time is required after the RRC connection re-establishment procedure is completely performed and until returning to a previous state that is a state before the UE declares the radio link failure. During this time period, the UE cannot receive a service from the BS. Therefore, if the radio link failure is frequently declared, quality of service also deteriorates.

Hereinafter, a failed CC denotes a CC in which a failure occurs when the channel quality of the corresponding serving cell channel quality is below a threshold. Further, a CC failure implies that a failure occurs in a CC. Alternatively, this may be called as a serving cell failure. The CC failure denotes a case where only a specific CC is the failed CC, and is different from a radio link failure in which all CCs are unusable. A CC which is not a failed CC is called as a non-failed CC.

The UE needs to determine whether the CC failure is the radio link failure according to an importance of a CC in which a failure occurs or a role of the CC. According to an importance of a failed CC, the UE needs to determine whether the RRC connection reestablishment procedure is performed.

Even if the UE determines whether the CC failure is the radio link failure, the determination result needs to be reported to a BS. This is because, if the radio link failure is not declared even if the CC failure occurs, the BS cannot immediately know a CC in which the CC failure occurs. As a result, the BS continuously uses the failed CC and the UE cannot transmit or receive data from the failed CC, which may lead to a data loss.

If the CC failure occurs in case of using a single carrier, the radio link failure is immediately declared and a connection re-establishment procedure is attempted. On the other hand, if the CC failure occurs in case of using multiple carriers, whether to declare the radio link failure or how to report information regarding the failed CC to the BS needs to be discussed.

According to an embodiment of the proposed invention, if the CC failure is not the radio link failure by which a connection to the BS is no longer maintained when the UE detects the CC failure, the UE reports the CC failure to the BS through a non-failed CC.

According to an embodiment of the proposed invention, if the failed CC is recovered when the UE detects the CC failure, the UE reports information on the recovered CC to the BS through a non-failed CC.

Figure 10:
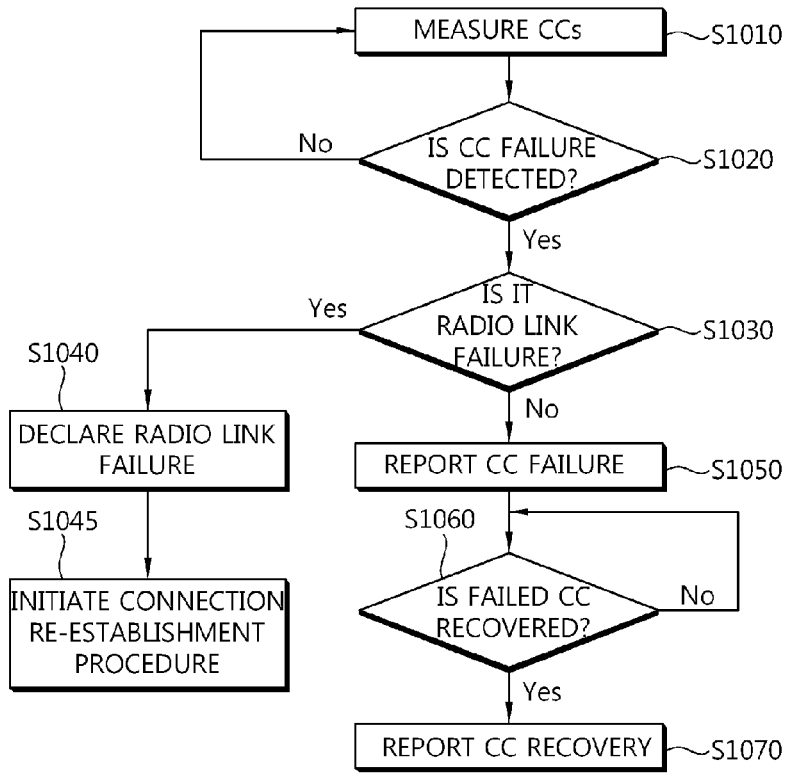
FIG. 10 is a flowchart showing a method of managing multiple carriers according to an embodiment of the present invention.

FIG. 10 is a flowchart showing a method of managing multiple carriers according to an embodiment of the present invention.

A UE performs measurement on a plurality of CCs (step S1010).

The UE detects whether a CC failure occurs on the basis of the measurement result (step S1020). A CC failure detection criterion for determining the CC failure will be described below.

Upon detecting the CC failure, the UE determines whether the CC failure implies a radio link failure (step S1030). A criterion thereof will be described below.

When the radio link failure is determined, the UE declares the radio link failure (step S1040), and starts a connection re-establishment procedure (step S1045).

If the CC failure does not imply the radio link failure, the UE reports information on the CC failure to a BS through a non-failed CC (step S1050).

Thereafter, the UE determines whether the failed CC is recovered (step S1060).

If the failed CC is recovered from the failure, the UE reports the recovery to the BS (step S1070).

The CC failure detection criterion for determining the CC failure is as follows. The criterion can be used for two different cases, i.e., a downlink CC failure and an uplink CC failure.

The UE may detect the downlink CC failure when one of the following conditions is satisfied.

(1) Downlink (DL) criterion 1: The UE can determine the CC failure based on a radio link monitoring result in a first layer. The first layer reports information of 'in sync' or 'out of synch' on a specific downlink CC to an RRC layer according to the radio link monitoring result. The RRC layer starts a timer upon receiving continuous 'out of synch' indication. The timer stops upon receiving continuous 'in synch' indication. The CC failure may be detected at the expiry of the timer.

(2) DL criterion 2: The CC failure may be detected when a PDCP layer, an RLC layer, and/or a MAC layer (or HARQ entity) of a specific downlink CC repetitively fail in reception.

The UE may detect an uplink CC failure if at least one of the following conditions is satisfied.

(1) Uplink (UL) criterion 1: The CC failure may be detected when a random access procedure of a specific CC fails.

(2) UL criterion 2: The CC failure may be detected when a PDCP layer, an RLC layer, and/or a MAC layer of a specific CC repetitively fail in transmission.

The BS may report to the UE a failure detection threshold to be used for detection of the CC failure by each layer. Alternatively, the failure detection threshold may be predetermined between the UE and the BS. A failure detection threshold may vary depending on a CC. The failure detection threshold may include a timer value, a failure count, etc. For example, if the failure detection threshold is the failure count, a failure of a specific CC is detected when transmission or reception of the UE fails by the number of times corresponding to the failure count.

Now, a criterion for determining a radio link failure by the UE will be described.

First, according to an importance of a CC used by the UE, the CC can be classified into a primary CC and a secondary CC. In the same manner, according to an importance of a serving cell used by the UE, the serving cell can be classified into a primary serving cell and a secondary serving cell. The primary CC and the secondary CC can be independently set for each of an uplink and a downlink.

The primary CC is a CC having a higher importance among CCs used by the UE. Examples of the primary CC include a CC for providing a control channel, a CC for providing a security configuration parameter, and/or a CC for providing criterion information for an operation of the UE (e.g., information used as a criterion for an object to be evaluated when a measurement result of a neighbor cell is evaluated). One UE has at least one primary CC. The BS may designate a specific CC among a plurality of CCs as the primary CC. Alternatively, the UE may select the primary CC and the BS may grant the selected primary CC.

The secondary CC is a CC other than the primary CC among the CCs used by the UE.

In addition, the CC can be classified into an active CC and an inactive CC according to whether the CC is activated or inactivated. The active CC is a CC capable of data transmission or reception. The primary CC and the secondary CC are all active CCs. The inactive CC is a CC incapable of data transmission or reception. However, in the inactive CC, the UE can perform a minimum operation such as measurement or the like. The BS can indicate CC activation/inactivation to the UE. In general, the primary CC does not be deactivated.

The UE may declare a downlink radio link failure when at least one of the following conditions is satisfied.

(1) Criterion 1: When a failure of all downlink primary CCs and a failure of at least one downlink secondary CC occur, the UE declares the downlink radio link failure.

(2) Criterion 2: When a failure of all downlink primary CCs occurs, the UE declares the downlink radio link failure. Therefore, even if the failure of the secondary CC occurs, the radio link failure is not declared.

(3) Criterion 3: When a failure occurs in all downlink CCs configured, the UE declares the downlink radio link failure.

(4) Criterion 4: When a failure occurs in all active downlink CCs, the UE declares the downlink radio link failure.

(5) Criterion 5: When a failure occurs in all CCs for providing a downlink control channel, the UE declares the downlink radio link failure.

Which criterion will be used among the criterion (1) to the criterion (5) above can be instructed by the BS to the UE.

In addition, the UE may declare an uplink radio link failure when at least one of the following conditions is satisfied.

(1) Criterion 1: If a failure of all uplink primary CCs occurs and a failure of at least one uplink secondary CC occurs, the UE declares the uplink radio link failure.

(2) Criterion 2: If a failure of all uplink primary CCs occurs, the UE declares the uplink radio link failure. Therefore, even if the failure of the secondary CC occurs, the radio link failure is not declared.

(3) Criterion 3: If a failure occurs in all uplink CC configured, the UE declares the uplink radio link failure.

(4) Criterion 4: If a failure occurs in all active uplink CCs, the UE declares the uplink radio link failure.

(5) Criterion 5: If a failure occurs in all CCs for providing an uplink control channel, the UE declares the uplink radio link failure.

Which criterion will be used among the criterion (1) to the criterion (5) above can be instructed by the BS to the UE.

Figure 11:
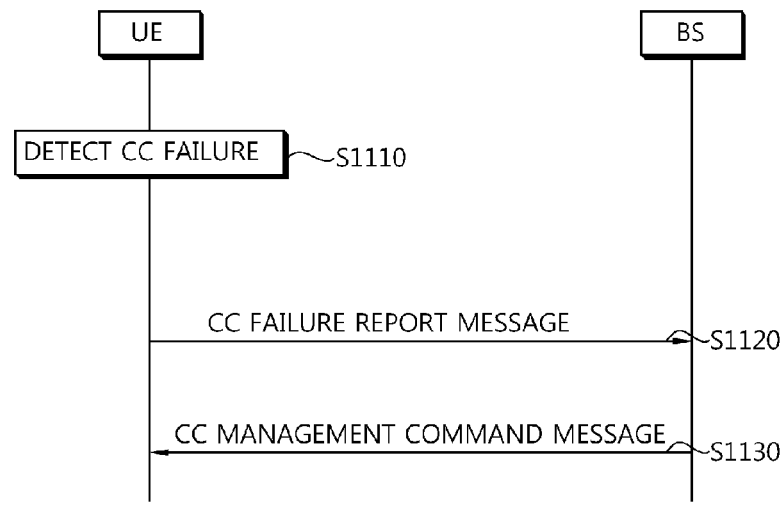
FIG. 11 is a flowchart showing a method of reporting a component carrier (CC) failure by a user equipment to a base station.

FIG. 11 is a flowchart showing a method of reporting a CC failure by a UE to a BS.

The UE detects a CC failure, and determine to report it to the BS (step S1110). The UE sends a CC failure report message to the BS (step S1120).

The BS may transmit a CC management command message in response to the CC failure report message (step S1130). The CC management command message may include information indicating activation of a new CC and/or inactivation of a failed CC. The CC management command message may include information indicating a removal of a failed CC and/or an addition of new CC. The CC management command message may include information indicating a setup of new primary CC.

The CC failure report message may include identifier information indicating one or more failed CCs. The identification information may include an identifier of a failed CC, an identifier of a measurement object to which the failed CC belongs, and/or a measurement identifier related to the measurement object to which the failed CC belongs.

The CC failure report message may include a measurement result on the failed CC. This may facilitate CC management performed by the BS.

The CC failure report message may include a measurement result on one or more CCs in which a CC failure does not occur. This may facilitate CC management performed by the BS.

The CC failure report message may include a failure cause on why a CC failure occurs in the failed CC. Examples of the failure cause may include a failure detected when a physical layer reports to an RRC layer, a failure detected when an RLC layer reports to the RRC layer, a failure detected when a MAC layer reports to the RRC layer, a failure detected when a NAS layer reports to the RRC layer, etc.

The CC failure report message may include a field for indicating whether a CC failure is an uplink CC failure or a downlink CC failure. This field is a 1-bit field. If a value of this value is '0', it may indicate that the CC failure is the uplink CC failure, and if the value thereof is '1', it may indicate that the CC failure is the downlink CC failure.

The CC failure report message may be transmitted through a non-failed CC.

Figure 12:
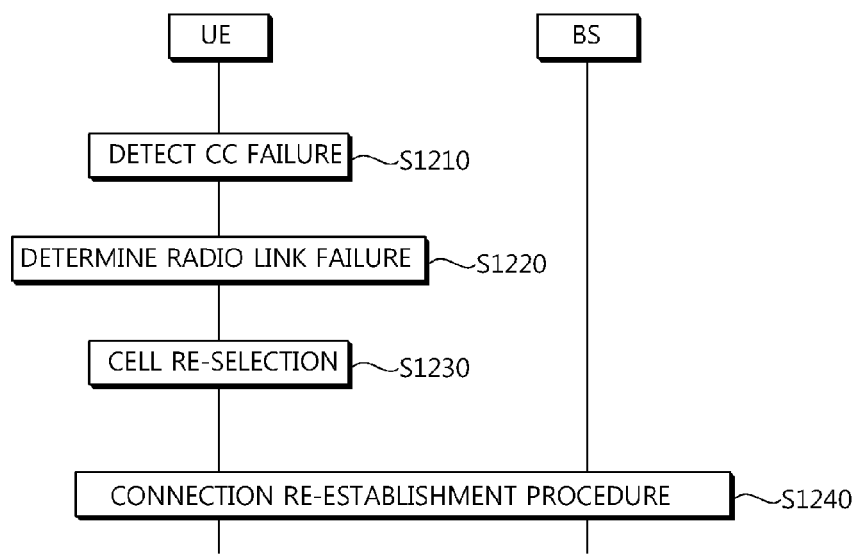
FIG. 12 is a flowchart showing a case where a radio link failure is triggered by a CC failure.

FIG. 12 is a flowchart showing a case where a radio link failure is triggered by a CC failure.

A UE detects a CC failure (step S1210). The UE determines whether a radio link failure occurs from the CC failure (step S1220). According to the radio link failure, the UE performs cell re-selection to select a new cell (step S1230). The UE performs an RRC connection re-establishment procedure by using the selected cell (step S1240).

Figure 13:
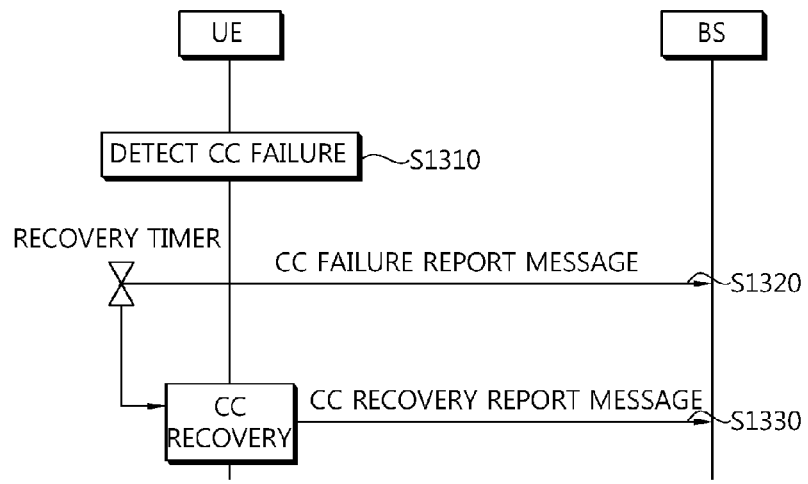
FIG. 13 is a flowchart showing a recovery of a CC failure.

FIG. 13 is a flowchart showing a recovery of a CC failure.

A UE detects a CC failure, and determines whether to report it to a BS (step S1310). The UE sends a CC failure report message to the BS (step S1320).

The UE starts a recovery timer when the CC failure report message is transmitted. A plurality of recovery timers may be provided for respective CCs or for respective frequency bands. If two failed CCs are detected, two recovery timers respectively correspond to the two failed CCs.

If the failed CC is recovered while the recovery timer is operating, the UE sends a CC recovery report message to the BS (step S1330). If the failed CC is not recovered until the recovery timer expires, the use of the corresponding CC is suspended.

If a value of the recovery timer is a specific value or the recovery timer does not start, irrespective of an operation of the recovery timer, the UE can send a CC recovery report message when the failed CC is recovered after the CC failure.

The CC recovery report message may include identifier information indicating one or more recovered CCs. The identification information may include an identifier of a recovered CC, an identifier of a measurement object to which the recovered CC belongs, and/or a measurement identifier related to the measurement object to which the recovered CC belongs.

The CC recovery report message may include a measurement result on the recovered CC. This may facilitate CC management performed by the BS.

The CC recovery report message may include a measurement result on one or more CCs in addition to the recovered CC. This may facilitate CC management performed by the BS.

The CC recovery report message may include a failure cause on why a CC failure occurs before the failed CC is recovered. Examples of the failure cause may include a failure detected when a physical layer reports to an RRC layer, a failure detected when an RLC layer reports to the RRC layer, a failure detected when a MAC layer reports to the RRC layer, a failure detected when a NAS layer reports to the RRC layer, etc.

The CC recovery report message may include a field for indicating whether the recovered CC is related to an uplink CC or a downlink CC.

The CC failure report message and the CC recovery report message may use report messages having the same format. In this case, the report message may include an indicator for indicating a CC failure report or a CC recovery report.

The CC failure report message and the CC recovery report message may be included in an existing message other than an additional message. For example, the measurement report message may include a CC failure report message and/or a CC recovery report message. The measurement report message may be a message reported by the UE to the BS by autonomously performing measurement on a plurality of CCs.

Dedicated messages may be used for the CC failure report message and the CC recovery report message.

The CC failure report and the CC recovery report may be transmitted by using a specific value or a field for indicating a CC failure or a CC recovery. For example, if it is assumed that a CQI can have a value in the range of 0to 15, a CQI having a value of '15' may be defined to indicate the CC failure or the CC recovery.

The CC failure report and the CC recovery report may be implicitly transmitted by using a specific resource. Thus, a specific radio resource related to a corresponding CC indicates the CC failure report or the CC recovery report. For example, the UE uses the specific radio resource for transmission of an uplink signal (e.g., a scheduling request, a sounding reference signal, a CQI, an HARQ ACK/NACK, a random access preamble, etc.). If a radio resource related to the CC failure report or the CC recovery report is used for transmission of the uplink signal, the BS can know the CC failure report or the CC recovery report as well as reception of the uplink signal.

When the CC failure occurs, the UE can report this fact rapidly to the BS. The BS can perform management so that the UE uses more suitable CCs, for example, by eliminating the failed CC from an available CC group of the UE or by replacing the failed CC to another new CC. In addition, the BS can prevent scheduling from being performed on the failed CC, and thus a data loss can be avoided and efficiency of radio resource use can increase.

Figure 14:
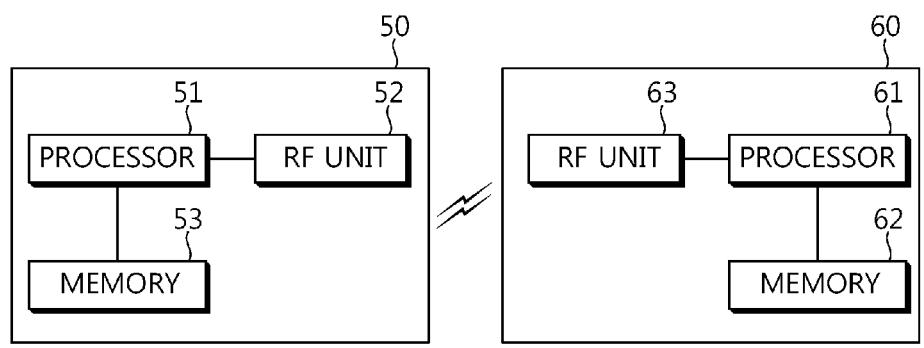
FIG. 14 is a block diagram showing wireless communication system to implement an embodiment of the present invention.

FIG. 14 is a block diagram showing wireless communication system to implement an embodiment of the present invention.

A BS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may support multiple carriers. The processor 51 may receive information on CC failure or CC recovery, and manages multiple carriers based on the information.

A UE 60 may include a processor 61, a memory 62 and a RF unit 63. The memory 62 is operatively coupled with the processor 61 and stores a variety of information to operate the processor 61. The RF unit 63 is operatively coupled with the processor 61, and transmits and/or receives a radio signal.

The processor 61 may be configured to implement proposed functions, procedures and/or methods described in this description. Layers of the radio interface protocol may be implemented in the processor 61. The processor 61 may detect a CC failure and determine whether a radio link failure is declared. The processor 61 may report the CC failure or the CC recovery to the base station.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of processing a failure of a component carrier (CC) in a multiple carrier system, the method comprising:
    detecting a failed CC among a plurality of CCs;
    determining whether to declare a radio link failure based on the failed CC;
    reporting information on the failed CC to a base station if the failed CC is not the radio link failure; and
    receiving, from the base station, a CC management command indicating inactivation of the failed CC.

2. The method of claim 1, wherein the detected failed CC is a CC that repetitively failed in transmission or reception in at least a medium access control (MAC) layer, a radio link control (RLC) layer or a packet data convergence protocol (PDCP) layer.

3. The method of claim 1, further comprising:
    declaring the radio link failure; and
    initiating a connection re-establishment procedure when the radio link failure is declared.

4. The method of claim 1, further comprising:
    detecting whether the failed CC is recovered; and
    reporting information on the recovered CC to the base station when the failed CC is recovered.

5. The method of claim 1, wherein the radio link failure is declared when the failed CC is a primary CC.

6. The method of claim 1, wherein the radio link failure is declared upon detection of a failure of a primary CC and at least one secondary CC.

7. The method of claim 1, wherein the radio link failure is declared upon detection of a failure of all of the plurality of CCs.

8. The method of claim 1, wherein the radio link failure is declared upon detecton of a failure of all active CCs among the plurality of CCs.

9. A user equipment for processing a failure of a component carrier (CC) in a multiple carrier system, the user equipment comprising:
- a radio frequency (RF) unit for transmitting and receiving a radio signal; and
- a processor operatively coupled to the RF unit and configured to implement a radio interface protocol, wherein the processor is configured to:
  - detect a failed CC among a plurality of CCs;
  - determine whether to declare a radio link failure based on the failed CC;
  - report information on the failed CC to a base station if the failed CC is not the radio link failure; and
  - receive, from the base station, a CC management command indicating inactivation of the failed CC.

10. The user equipment of claim 9, wherein:
- the radio interface protocol comprises a medium access control (MAC) layer, a radio link control (RLC) layer, and a packet data convergence protocol (PDCP) layer; and
- the processor is further configured to detect the failed CC when transmission or reception of a CC repetitively fails in at least the MAC layer, the RLC layer or the PDCP layer.

11. The user equipment of claim 9, wherein the processor is further configured to:
- detect whether the failed CC is recovered; and
- report information on the recovered CC to the base station when the failed CC is recovered.

12. The user equipment of claim 9, wherein the processor is further configured to:
- declare the radio link failure; and
- initiate a connection re-establishment procedure when the radio link failure is declared.

13. The user equipment of claim 9, wherein the processor is further configured to declare the radio link failure when the failed CC is a primary CC.

14. The user equipment of claim 9, wherein the processor is further configured to declare the radio link failure upon detection of a failure of a primary CC and at least one secondary CC.

15. The user equipment of claim 9, wherein the processor is further configured to declare the radio link failure upon detection of a failure of all of the plurality of CCs.

16. The user equipment of claim 9, wherein the processor is further configured to declare the radio link failure upon detection of a failure of all active CCs among the plurality of CCs.

* * * * *